US011106641B2

(12) United States Patent
Zizka et al.

(10) Patent No.: US 11,106,641 B2
(45) Date of Patent: Aug. 31, 2021

(54) SUPPORTING GRAPH DATABASE BACKED OBJECT UNMARSHALLING

(71) Applicant: Red Hat, Inc., Raleigh, NC (US)

(72) Inventors: Ondrej Zizka, Ceske Budejovice (CZ); Jesse Daniel Sightler, Moncks Corner, SC (US)

(73) Assignee: Red Hat, Inc., Raleigh, NC (US)

( * ) Notice: Subject to any disclaimer, the term of this patent is extended or adjusted under 35 U.S.C. 154(b) by 197 days.

(21) Appl. No.: 15/681,014

(22) Filed: Aug. 18, 2017

(65) Prior Publication Data
US 2019/0057119 A1  Feb. 21, 2019

(51) Int. Cl.
G06F 17/00 (2019.01)
G06F 16/21 (2019.01)
G06F 16/901 (2019.01)
G06F 16/28 (2019.01)

(52) U.S. Cl.
CPC ............ *G06F 16/212* (2019.01); *G06F 16/28* (2019.01); *G06F 16/9024* (2019.01)

(58) Field of Classification Search
None
See application file for complete search history.

(56) References Cited

U.S. PATENT DOCUMENTS

| 6,424,991 | B1 | 7/2002 | Gish |
| 7,962,565 | B2 | 6/2011 | Coker |
| 9,110,711 | B2 | 8/2015 | Abdelaziz |
| 9,135,145 | B2 | 9/2015 | Voccio |
| 9,183,613 | B2 | 11/2015 | Gong et al. |
| 9,501,334 | B2 | 11/2016 | Fink |
| 9,576,071 | B2 | 2/2017 | Metreveli et al. |
| 9,727,522 | B1* | 8/2017 | Barber ................. G06F 9/5016 |
| 9,864,528 | B2 | 1/2018 | Vega-Gonzalez |

(Continued)

FOREIGN PATENT DOCUMENTS

WO   WO2016198346   12/2016

OTHER PUBLICATIONS

Nguyen et al, "Building Call Graphs for Embedded Client-Side Code in Dynamic Web Applications", ECpE Department Iowa State University, USA; School of Computer Science Carnegie Mellon University, USA, Nov. 16-22, 2014, 12 pages https://www.c.s.cmu.edu/~ckaestne/pdf/fse14.pdf.

(Continued)

Primary Examiner — Hasanul Mobin
(74) Attorney, Agent, or Firm — Lowenstein Sandler LLP

(57) ABSTRACT

Implementations of the disclosure provide for unmarshalling objects from a back-end server graph database as they would be available in local memory at a client device. An apparatus is provided that comprises a memory and a processing device to inspect a graph model associated with an object comprising a plurality of node data structures. The graph model defines one or more services provided by each node of the object. Using a graph database, graph data elements are identified for at least one node data structure of the object in view of the inspected graph model. Metadata that describes the object associated with the inspected graph mode is generated. Thereupon, the metadata is provided to reconstruct using the graph data elements the one or more services associated with the object at a client device.

20 Claims, 5 Drawing Sheets

(56) References Cited

U.S. PATENT DOCUMENTS

| | | | | |
|---|---|---|---|---|
| 10,148,750 | B1* | 12/2018 | Burriss | G06F 3/067 |
| 10,423,390 | B1* | 9/2019 | Mani | G06F 8/30 |
| 10,437,885 | B2 | 10/2019 | Sightler | |
| 2005/0243610 | A1* | 11/2005 | Guha | G06F 1/3287 |
| | | | | 365/189.05 |
| 2006/0136351 | A1* | 6/2006 | Angrish | G06F 16/958 |
| 2006/0136684 | A1* | 6/2006 | Le | G06F 3/065 |
| | | | | 711/154 |
| 2006/0200438 | A1* | 9/2006 | Schloming | G06F 16/284 |
| 2007/0094269 | A1* | 4/2007 | Mikesell | G06F 16/1834 |
| 2010/0250867 | A1* | 9/2010 | Bettger | G06F 16/176 |
| | | | | 711/152 |
| 2011/0082879 | A1 | 4/2011 | Hazlewood et al. | |
| 2012/0096070 | A1* | 4/2012 | Bryzak | H04L 67/02 |
| | | | | 709/203 |
| 2013/0117326 | A1 | 5/2013 | De Smet et al. | |
| 2013/0268583 | A1 | 10/2013 | Sheppard et al. | |
| 2014/0189348 | A1* | 7/2014 | El-Shimi | G06F 21/6218 |
| | | | | 713/165 |
| 2016/0156631 | A1 | 6/2016 | Viswanathan et al. | |
| 2016/0275583 | A1 | 9/2016 | Cambianica | |
| 2018/0191865 | A1* | 7/2018 | De Gaetano | G06F 8/60 |
| 2018/0197128 | A1 | 7/2018 | Carstens et al. | |
| 2018/0295206 | A1* | 10/2018 | Devaraju | H04L 67/2847 |
| 2019/0065620 | A1 | 2/2019 | Murray et al. | |

OTHER PUBLICATIONS

Graph Visualization for Neo4j, NEO4J, accessed Aug. 18, 2017, 8 pages https://neo4j/com/developer/guide-data-visualization/.

Shiraguppi et al, "Graph Based Model for Object Access Analysis at OSD Client", Indian Institute of Technology, Kanpur, accessed Aug. 18, 2017, 12 pages https://www.cse.iitk.ac.in/users/moona/papers/hipc07.pdf/.

Oracle, "Oracle Fusion Middleware Understanding Oracle TopLink", Oracle Help Center, Copyright 2015, 22 pages.

Michael Hunger et al., "Spring Data Neo4j—Reference Documentation", 2010-2017 Grah Aware Ltd—Neo Technology, Inc.—Pivotal Software, Inc., 114 pages.

Anat Bhardwaj et al., "DataHub: Collaborative Data Science & Dataset Version Management at Scale", MIT; U. Maryland (UMD); U. Illinois (UIUC), Sep. 2, 2014, 7 pages.

USPTO, Office Action for U.S. Appl. No. 15/902,297, dated Jan. 15, 2020.

USPTO, Notice of Allowance for U.S. Appl. No. 15/902,297, dated May 26, 2020.

USPTO, Notice of Allowance for U.S. Appl. No. 15/902,297, dated Sep. 11, 2020.

USPTO, Corrected Notice of Allowability for U.S. Appl. No. 15/902,297, dated Sep. 23, 2020.

* cited by examiner

SUPPORTING GRAPH DATABASE BACKED OBJECT UNMARSHALLING

TECHNICAL FIELD

The implementations of the disclosure relate generally to computing infrastructures and, more specifically, relate to supporting graph database backed object unmarshalling.

BACKGROUND

Computing systems and devices may access, store, process, or communicate with a database. A database may store data or information in various formats, models, structures, or systems using different types of database structures. Users or processes may access or query the databases to fetch or retrieve data in a database, or to transfer or otherwise share information between varying database systems as well as the computing systems and devices the databases support.

BRIEF DESCRIPTION OF THE DRAWINGS

The disclosure can be understood more fully from the detailed description given below and from the accompanying drawings of various implementations of the disclosure. The drawings, however, should not be taken to limit the disclosure to the specific implementations, but are for explanation and understanding only.

The disclosure is illustrated by way of examples, and not by way of limitation, and may be more fully understood with references to the following detailed description when considered in connection with the figures, in which.

DETAILED DESCRIPTION

Figure 1:
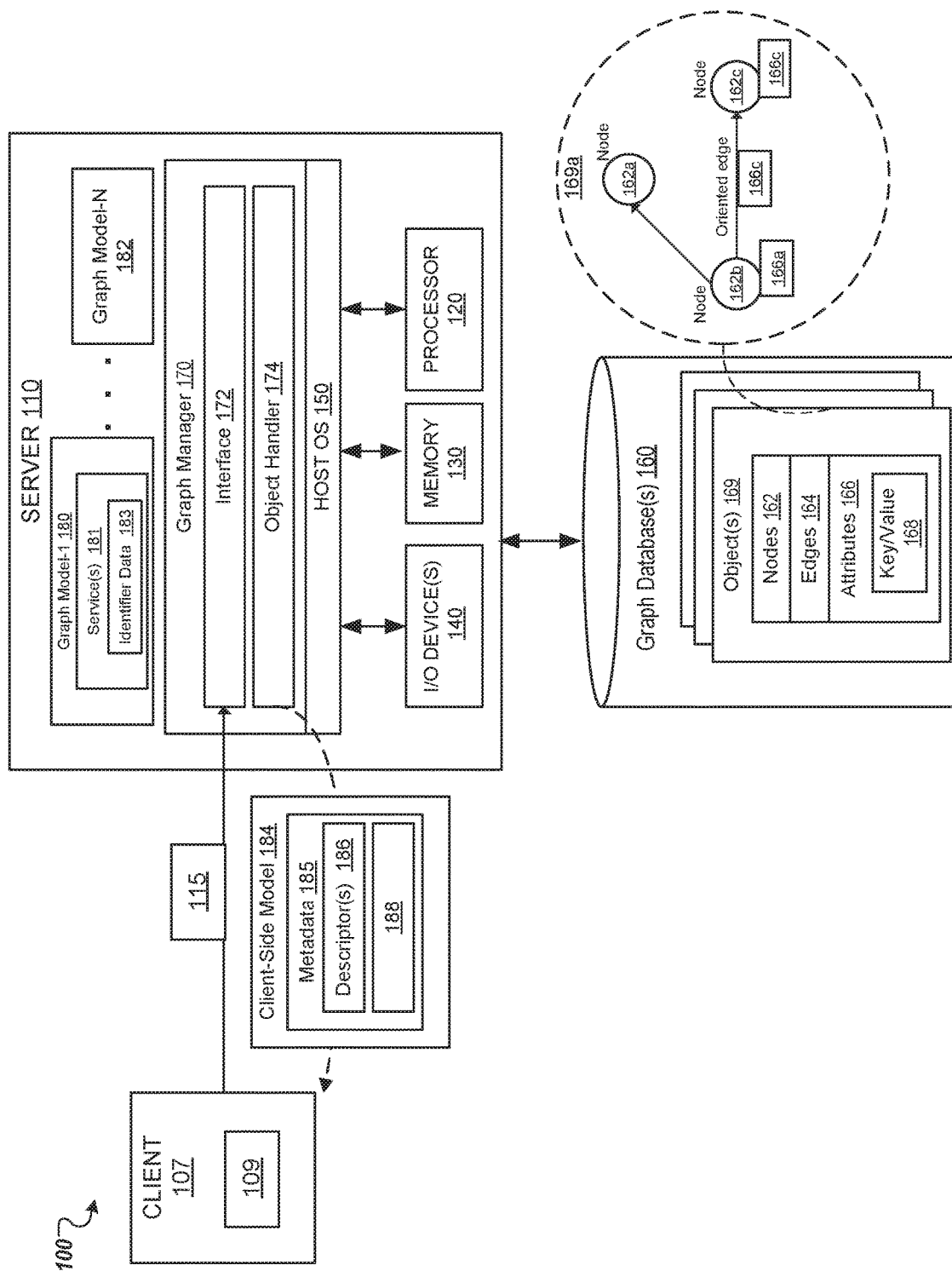
FIG. 1 is a block diagram of a computer system to support graph database backed object unmarshalling according to an implementation of the disclosure.

A graph database is a storage database engine that is used for storing and retrieving vast amount of information. The graph database uses graphs as a database abstraction to link related information in one or more "graph" structures comprising nodes and edges contenting related nodes. A "graph" is a type of data structure (such as a directed acyclic graph) comprising nodes (also referred to as vertices), edges and attributes (also referred to as properties) to organize and store data. A "node" (also referred to as a node data structure) may represent, for example, stored data for an entity such as a person, business, account, artifact, etc. An "edge" may represent a relationship between a pair of entities. "Attributes" are stored information that relates to the nodes or edges. The nodes in the graphs may be connected together by one or more edges. For example, if two nodes have a common value for a particular attribute, an edge may be formed between the nodes representing the commonality. The nodes are configured to perform certain services associated with the graph, and such services can include sorting, querying and retrieving certain attributes for a particular entity of the graph.

The graph databases can store attributes as data values associated with the nodes and edges in a key-value pair. A "key" is generally a unique identifier that identifies a node or edge in a graph or a set of nodes or edges in a graph. In that regard, the graph database information may be sent and received from the graph database as key-value information. When graph database information is stored, a back-end server machine sends both a key and an attribute value to the graph database. When graph database information is retrieved, the server machine sends only a key to the graph database to retrieve the corresponding value for the node or edge stored in the graphs.

An object-oriented application can be implemented to utilize the graph databases. Object-oriented applications organize data and routines together into encapsulated units referred to as objects. An "object" is a set of data and functional services or capabilities (e.g., routines) encapsulated into a single logical entity stored in memory. One type of object-oriented application, referred to herein as an object-graph mapper (OGM), maps nodes and the relationships between the nodes in the graph database to objects in an "authoritative model" of a system. The authoritative model describes what properties such as available object functionally or services an object of a given type may include, but does not include actual data for the object (e.g., identifiers, values, etc.). In one example, the authoritative model may represent native Java™ objects.

The OGM provides a way for the authoritative model of the objects to be persisted in the underlying graph database servers. For example, a user may use a graphical tool associated with the OGM to design a framework for classes that represent the authoritative model of an object. The OGM maps nodes and the relationships between the nodes in the graph to the authoritative models. The authoritative models are then stored on the underlying graph database servers and can be used to query the graph data of the graph database. In some situations, an application interface may be used to transfer the "raw" graph data elements in the key-value pairs associated with the nodes and edges of the graph to a client device. During this transfer, however, the graph structure associated with the authoritative models is not maintained. As such, on the client side, it is necessary to recreate these graph structures using the "raw" graph data elements.

There are, however, several issues that can occur when recreating the graphs at the client device. For example, there can be a larger number of platforms used by the various client devices which means it may be necessary to recode the graphs for each platform. In that regard, the graphs have to be restored by the client devices from the graph data to use the object-oriented structures of the graphs on each different platform. Moreover, to implement techniques for performing this restoration can be very time-consuming, error prone leading to unexpected client failures, and produce massive iterations of boilerplate code that can become frequently obsolete. For example, the authoritative models may change often so the models are not always known in advance. In such cases, additional redundant efforts may be needed to maintain the object models on the client side due to the changing authoritative models on the back-end graph database servers.

Implementations of the disclosure address the above-mentioned and other deficiencies by providing an graphs manager for "unmarshalling" objects from the graph database to be returned the clients as if the clients had them available in local memory or storage. In that regard, unmarshalling refers to the process of transforming a representation of an object that was used for storage or transmission to a representation of the object that is consumable by a processing device on a certain platform. In some implementations, the graphs manager may be installed at back-end server machine for performing the techniques disclosed herein. The graphs manager may inspect an authoritative model in order to generate client side object models that mimic the services provided by the authoritative model for an existing object.

In some implementations, the graphs manager uses "reflection" to inspect the authoritative model in order to generate a similar client side object model of a particular platform for a client device. For example, if an original authoritative model is for a first programming platform, such as native Java®, then a client side object model may be generated that is suitable for a second programming platform, such as TypeScript® or Python®. Reflection is a programing technique with the ability to identify what information the model contains and dynamically modify this information that may include the methods, attributes, etc. of classes associated with the models. Then, on a target programming platform, such as a programming platform of the client device, these generated client side object models are used to reconstruct the graphs back from the data retrieved from the graph database.

The generated client side object models, in implementations, include metadata that instructs a client-application at the client device on how to reconstruct the objects using raw graph data elements, such as the key-value pair data. This metadata may include information that describes the object associated with the inspected authoritative model, for example, this may include an object-type discriminator (e.g., object class type) for the object as well as other information associated with the object. For example, the object-type discriminator describes what model is to be used to reconstruct the object. In some implementations, the graph manager includes a service provider interface (SPI) that serves the raw graph data elements associated with the client side object models to the client device. For example, the client device via the client-application may provide graph queries to the SPI to get the raw graph data elements that represent an object stored in the graph database. Then, the client-application determines the object types based on their object-type discriminators in the metadata, and instantiates the objects at the client device which are then filled in with the raw graph data elements.

In some implementations, the client device via the client-application may execute methods of a particular object of the client side object models, as is in typical object oriented programming. Upon calling a particular service of a certain object via the SPI, this call is intercepted by an object handler component of the graphs manager. The object handler component uses the certain data from that particular service to determine which nodes and data for those nodes to retrieve from the graph database. For example, this data may include an identifier for each of the nodes such as an uniform resource identifier (URI) that is a unique identifier for data in the graph database that is linked to the node, a numeric identifier corresponding to an internal graph database identifier, an identifier of a starting node and a set of matching criteria that can be applied to determine which related nodes to retrieve data from the graph database as well as other types of identifiers. The object handler then retrieves the raw graph data elements (e.g., key-value pair data) stored in the graph database for the nodes.

The object handler via the SPI returns the retrieved raw graph data elements to the client-application at the client device. Then, the client-application may instantiate a related object using this data in local memory or storage of the client device. In this way, the client application can retrieve graphs from the back-end graph database in the form of client platform specific objects mimicking the server side objects, and in a way that is transparent to the client device. For example, the client application may instantiate the related object is a background process. Thus, an advantage of the using generated client side object models is that there is no need to rewrite new models for every new platform used to serve as the client platform. Moreover, since the client side object models are generated from one source they are less likely to get out of synchronization with the original authoritative models.

FIG. 1 is a block diagram 100 of a computer system 110 in which implementations of the disclosure may operate. "Computer system" herein shall refer to a system comprising one or more computing devices, one or more memory devices, and one or more communication interfaces. As shown, the computer system 100 may include a client computer (e.g., client 107), and a server computing device (referred to later in this disclosure as "server 110) coupled to a network (not shown) and including one or more processors (e.g., processor 120) communicatively coupled to memory (e.g., memory 130) and one or more input/output (I/O) devices (e.g., I/O devices 140). The network may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

"Processor" 120 herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, processor 120 may be implemented as a single integrated circuit, two or more integrated circuits, or may be a component of a multi-chip module (e.g., in which individual microprocessor dies are included in a single integrated circuit package and hence share a single socket).

A processor 120 may also be referred to as a central processing unit (CPU). "Memory" 130 herein refers to a volatile or non-volatile memory device, such as RAM, ROM, EEPROM, or any other device capable of storing data. "I/O device" 140 herein refers to a device capable of providing an interface between a processor and an external device capable of inputting and/or outputting binary data. Although, for simplicity, a single processor 120 is depicted in FIG. 1, in some other embodiments the computing devices of computer system 100 may comprise a plurality of processors. Similarly, in some other embodiments the computing devices of computer system 100 may comprise a plurality of I/O devices, rather than a single I/O device 140.

The server 110 may be a server, a mainframe, a workstation, a personal computer (PC), a mobile phone, a palm-sized computing device, etc. The server 110 may run "host"

software, such host operating system 150 to manage the hardware and other types of system resources that may include processors 120, memory 130, I/O device 140 to provide functions such as inter-process communication, scheduling, memory and data management, and so forth. For example, the host operating system 150 of server 110 may include a virtualization manager (not shown), such as a hypervisor. Alternatively, the hypervisor may a "bare metal" hypervisor that runs on hardware of computer system 110 without an intervening operating system. The hypervisor 150 may abstract the physical layer of server 110, including processor 120, memory 130, and I/O device 140, and present this abstraction to a client application container, such as a virtual machine.

System 100, in implementations, may include one or more graph databases 160. In some implementations, the graph databases 160 may be a separate component from server 110. In alternative implementations, the graph databases 160 may be included with the server 110. For example, all or part of the graph databases 160 may be in the memory 130 of server 110. In other implementations, the graph databases 160 can be divided into multiple databases with components that can be geographically dispersed and accessible, for example, via a network.

Graph database 160 uses graph data structures with nodes 162 (also referred to as a node data structure), edges 164 and attributes 166 to stored data. For example, nodes 162*a-c* for object 169*a* may represent, for example, an entity such as people, businesses, accounts, artifacts, etc. Edge 164 may represent relationships between pairs of entities, such as the oriented edge between nodes 162*b* and 162*c*. In that regards, the nodes 162*a-c* in a particulate graph may be connected together by one or more edges 164. For example, if two nodes 162 have a common value for a particular attribute, an edge 164 may be formed between the nodes 162 representing the commonality. The nodes 162*a-c* may be associated with certain services associated with the graph, and such services can include sorting, querying and retrieving certain attributes for a particular entity of the node.

Attributes 166*a-c* are stored information, such as a key/value map of properties 168, which relates to the nodes 162 or edges 164. The graph database 160 can store attributes 166 as data values associated with the nodes 162 and edges 164 in a key-value pair 168. A "key" is generally a unique identifier that identifies a node 162 or edge 164 in a graph or a set of nodes 162 or edges 164 in a graph. In that regard, the graph database 160 information may be sent and received from the graph database 160 as key-value information. When information of the graph database 160 is stored, server 110 sends both a key and a value to the graph database 160. When the information is retrieved from the graph database 160, the server 110 sends only a key to the graph database 160 to retrieve the corresponding attribute value for the node 162 or edge 164 stored in the graphs.

Nodes 162 and the edges 164 representing the relationships between the nodes 162 in the graph database 160 can be mapped to objects 169. For example, a user (such as an administrator) of system 100 may use an object-graph mapper (OGM) application to map nodes 162 in the graph database 160 to graph models 180-182 of a corresponding object 169. In one implementation, the objects 169 may be represented as native Java™ objects. The graph models 180-182 describe what properties such as available object functionally or services 181 for the corresponding object 169 of a given type may include, but does not include actual data for that object. In some implementations, the services 181 may include identifier data 183 to determine which nodes 162 and data for those nodes to retrieve from the graph database 160. For example, this data may include an identifier for each of the nodes such as an uniform resource identifier (URI) that is a unique identifier for data in the graph database that is linked to the node, a numeric identifier 183 corresponding to an internal graph database identifier, an identifier data 183 an include an identifier of a starting node and a set of matching criteria that can be applied to determine which related nodes to retrieve data from the graph database as well as other types of identifiers. The OGM abstracts the structure of the nodes 162 and their edges 164 and provides a way for the objects 169 to be persisted in the graph database 160. For example, the user may use a graphical tool associated with the OGM to design a framework for classes that represent the objects 169. The OGM may generate objects 169 (e.g., Java™ objects) representing the classes.

System 100, in implementations, provide techniques for unmarshalling these objects 169 from the graph database 160 to be returned a client 107 as if the client 107 had them available in local memory or storage. In that regard, unmarshalling refers to the process of transforming a representation of an object that was used for storage or transmission to a representation of the object that is executable by a processing device on a certain platform. In some implementations, server 10 includes a graph manager 170. In some implementations, the functionality of the graph manager 170 can exist in a fewer or greater number of components than what is shown, with such components residing at one or more computing devices of system 100 that may be geographically dispersed. The components may be operable in conjunction with client 107 and server 110 from which it may receive requests to query the objects 169 and provide relevant information regarding those objects 169 from the graph databases 160.

The graph manager 170 can generate client-side models 184 for clients (e.g., client 107) that mimic services 181 provided by the graph models 180-182 for objects 169 of the graph database 160, and manage the distribution of metadata 185 for these client-side models 184 to the client 107. This metadata 185 may causes the objects 160 to be reconstructed locally at the client 107. For example, this metadata 185 may instruct a client-application (not shown) at the client device 107 on how to reconstruct the objects 169 using raw graph data elements, such as the key/value pairs 168, from the graph database 160.

To generate the client-side models 184, the graph manager 170 may use reflection to inspect the graph models 180-182 associated with the objects 169. Reflection is a programing tool used to inspect and dynamically call and identify classes, methods, attributes, etc of objects, without knowing the names of the classes and methods of the objects beforehand. By using reflection, the graph manager 170 is able to determine which services 181 are associated with the objects 169. For example, the services 181 represents the classes and the functionally (e.g., methods) available to the objects 169 associated with the classes.

Once the graph model 180 for the graph object 169 is inspected, the graph manager 170 generates metadata 185 for the client-side model 184 that includes information to describe the object associated with the inspected model. For example, the metadata 185 may include an object-type discriminator (e.g., object class type) 186 for the object as well as fields 188 other relevant data associated with the object. This metadata 185 may instruct a client-application (not shown) at the client device 107 on how to unmarshall the objects 169 using raw graph data elements, such as the key/value pairs 168, from the graph database 160.

To facilitate operations of system 100 to support unmarshalling of objects 169 at the client device 107, the graph manager 170 includes an interface 172 also referred to herein in as service provider interface (SPI 172) that serves raw graph data elements, such as the key/values pairs 168) associated with nodes 162 of the graph models 180 to the client device, and an object handler 174 that uses the metadata 185 of the graph models 180 to determine which nodes 162 and related the key/value pairs data 168 for the raw graph data elements to retrieve or otherwise retrieve from the graph database 160.

In some implementations, the client device 107 may include a client-application 109 to provide graph queries 115 to the SPI 172 to get the data comprising the raw graph data elements to instantiate objects 169 based on the client-side model 184. When this data is provided, the client-application 109 determines the object type of the nodes 162 of a particular object based on its object-type discriminator 186 in the metadata 185 to instantiate the objects 169 at the client device 107 and fills in the object with the data. In some implementations, the client device 107 via the client-application 109 may execute a method of a particular object as in typical object oriented programming.

Upon calling a particular method of a certain object via the SPI 172, this call is intercepted by an object handler component 174 of the graph manager 170. The object handler component 174 uses identifier data 183 of the services to determine which nodes and data for those nodes to retrieve from the graph database 160. For example, the object handler component 174 may use the identifier data 183 to identify nodes for the related object 169. The object handler component 174 then retrieves the raw graph data elements (e.g., key-value pair data 168) stored in the graph database 160 for the nodes. In this regard, references to specific graph data elements in the graph database 160, such as for the key-value pair data 168.

In some implementation, the identifier data 183 is used to identify the node of set of nodes in the object 169. In that regard, the graph manager 170 may determine identifiers for the nodes 162 in several ways. For example, the graph manager 170 may use the identifier data 183 to identify numeric identifiers representing internal graph database identifiers for one or more nodes 162 in a given object 169. In some implementations, the graph manager 170 may use the identifier data 183 to identify an identifier of a starting node 162 in the object 169 and criteria information to determine which nodes other nodes 162 are related to that node 162. For example, the graph manager 170 may traverse the object 169 and use the criteria information to identify the related nodes that match criteria information. In other implementations, other techniques may be used to determine identifiers for nodes 162 in the objects 169 to be unmarshalled at the client device 107.

The object handler component 174 returns the client-side model 184 along with a portion of all of the metadata 185 to the client-application 109 at the client device 107, which it uses as instructions to compose the object 169 at the client 107. For example, this causes the client-application 109 to instantiate related objects using this metadata 185 in local memory or storage of the client device 107, and fill in the instantiated objects with data values (e.g., key/value pairs) from the graph database 160. In this way, the client-application 109 can retrieve objects from the back-end graph database 160 in the form of client platform specific objects mimicking the server side objects, and in a way that is transparent to the client device 107.

Figure 2:
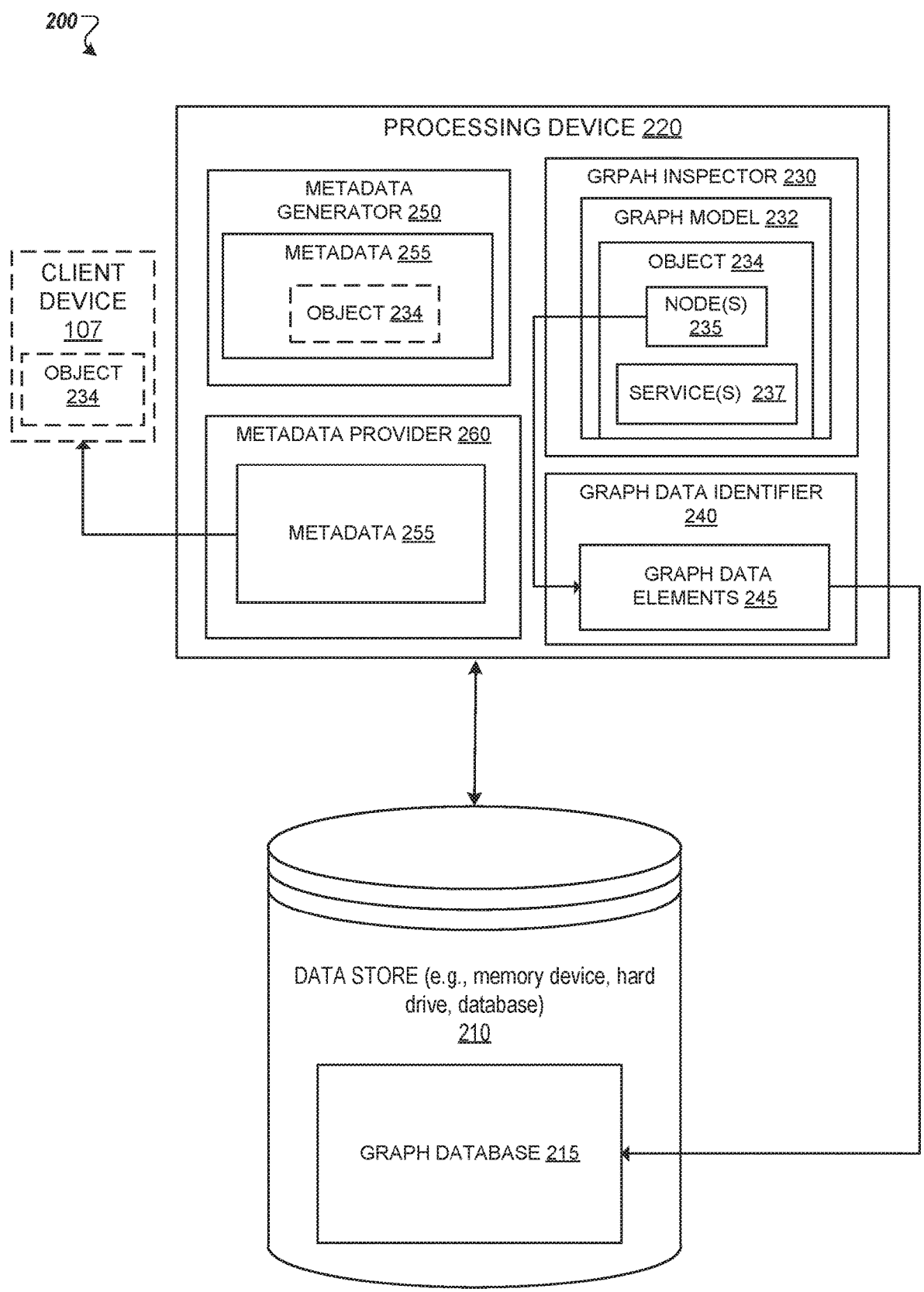
FIG. 2 is a block diagram of an apparatus including a memory to support graph database backed object unmarshalling according to an implementation of the disclosure.

FIG. 2 is a block diagram of an apparatus 200 including a memory 210 to support graph database backed object unmarshalling according to an implementation of the disclosure. In that regard, unmarshalling refers to the process of transforming a representation of an object that was used for storage or transmission to a representation of the object that is executable by a processing device on a certain platform. The apparatus 200 may be the same or similar to a components within the computer system 100 of FIG. 1. In some implementations, the apparatus 200 may include processing device 220 (which may be the same or similar to processing device 120), operatively coupled to memory 210 (which may be the same or similar to memory 130), to execute instructions for carrying out the operations as discussed herein. As shown, the apparatus 200 may execute instructions for a graph inspector 230, a graph data identifier 240, a metadata generator 250 and a metadata provider 260 to provide metadata to a client, such as client device 107 that instructs a the client device 107 on how to unmarshall objects using raw graph data elements.

Data store 210 may include any non-persistent data storage (e.g., memory), persistent and/or volatile data storage (e.g., flash storage, hard drive, tape), other medium, or combination thereof that is capable of storing instructions for carrying out the operations of the apparatus 200 discussed herein. In some implementations, the data store 210 may store graph data. For example, the data store 210 stores data of a graph database 215. The graph database 215 that is used for storing and retrieving vast amount of information by using graphs as a database abstraction to link related information. A "graph" is a type of data structure comprising nodes (also referred to as vertices), edges and attributes (also referred to as properties) to organize and store data.

In some implementations, an application process, such as OGM, may abstract the graphs from graph database 215 and provides a way for objects to be persisted in the graph database 215. For example, a user may use a graphical tool associated with the OGM to design a framework for classes that represent the graphs. The OGM may generate objects (e.g., Java™ objects) representing the classes.

In operation of the apparatus 300, the graph inspector 230 inspects a graph model 232 associated with an object 234 comprising a plurality of nodes 235. For example, the graph inspector 230 uses reflection to inspect the graph model 232. Reflection is a programing tool used to inspect and dynamically call classes, methods, attributes, etc of the model 232 without knowing the names of the classes and methods of beforehand. By using reflection, the graph inspector 230 is able to determine a layout of the classes and the functionally (e.g., methods) or services 237 associated with the classes of the model 232.

The graph data identifier 240 identifies graph data elements 245 from the graph database 245 for at least one node data structure 235 of the object 234 in view of the inspected graph model 232. To identify the at least one node data structure 235, the services 237 associated with the graph model 232 may include identifier data for the nodes. For example, this identifier data may include an identifier for each of the nodes 235 in the object 234 such as an uniform resource identifier (URI) that is a unique identifier for data in the graph database 215 that is linked to the node 235, a numeric identifier corresponding to an internal graph database identifier, an identifier of a starting node and a set of matching criteria that can be applied to determine which related nodes to retrieve data from the graph database 215 as well as other types of identifiers.

Metadata generator 250 generates metadata 255 or the at least one node data structure 235 of the graph model 245 in view of a graph database 215. This metadata 255 may instruct a client-application (not shown) at the client device 107 on how to reconstruct the objects 234 using raw graph data elements 245. For example, the metadata 255 comprises information the describes the object associated with the inspected graph model 232, for example, this may include an object-type discriminator (e.g., object class type) for the object 234 as well as other information associated with the object 232. For example, the object-type discriminator describes what model is to be used to reconstruct the object 234.

Metadata provider 260 provides the metadata 255 to the client device 107, which causes the services 237 associated with the graph model 232 to be reconstructed at the client device 107. For example, the metadata provider 260 returns a portion of all of the metadata 255 comprising the raw graph data elements 245 to the client device 107. This causes the client device 107 to instantiate related objects 234 in local memory or storage of the client device 107 using this data 245.

Figure 3:
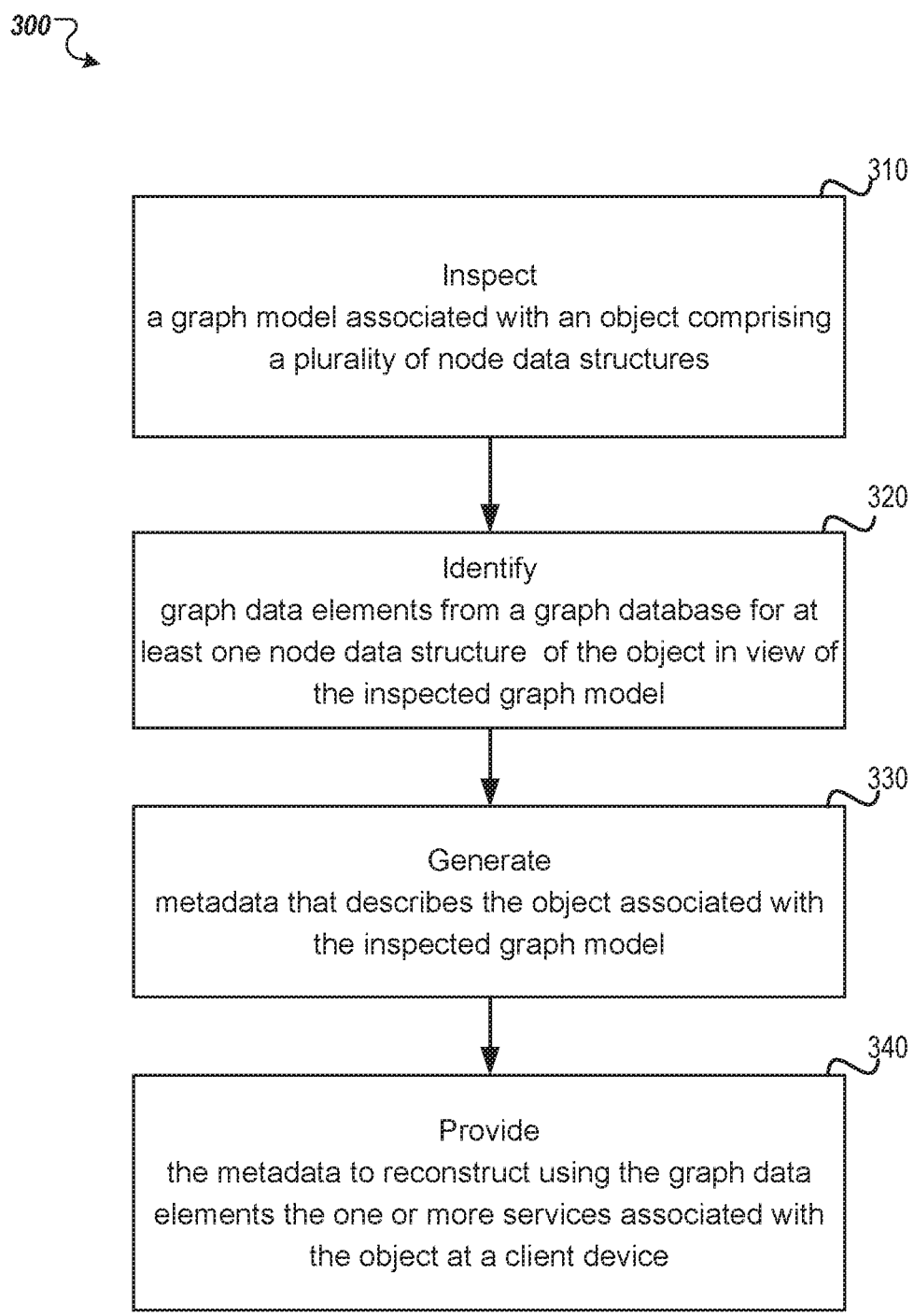
FIG. 3 illustrates a flow diagram of a method of supporting graph database backed object unmarshalling according to an implementation of the disclosure.

FIG. 3 depicts a flow diagram of one implementation of a method 300 in accordance with one or more aspects of the disclosure. In one implementation, the processing device 220 of FIG. 2 may perform method 300 for supporting graph database backed object unmarshalling. The method 300 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 300 and each of its individual functions. In certain implementations, a single processing thread may perform method 300. Alternatively, two or more processing threads with each thread executing one or more individual functions, routines, subroutines, or operations may perform method 300. It should be noted that blocks of method 300 depicted in FIG. 3 can be performed simultaneously or in a different order than that depicted.

Referring to FIG. 3, at block 310, method 300 inspects a graph model 232 associated with an object 234 comprising a plurality of node data structures 235. The graph model 232 defines one or more services 237 provided by the object 234. In block 320, graph data elements 245 from a graph database 215 are identified for at least one node data structure 235 of the object 234 in view of the inspected graph model 232. In block 330, metadata 255 for the at least one node data structure 235 is generated that describes the object 234 associated with the inspected graph model 232. In block 340, this metadata 255 is provided to a client device 107 which causes the one or more services 237 associated with the object 234 to be reconstructed at the client device 107 using the graph data elements 245.

Figure 4:
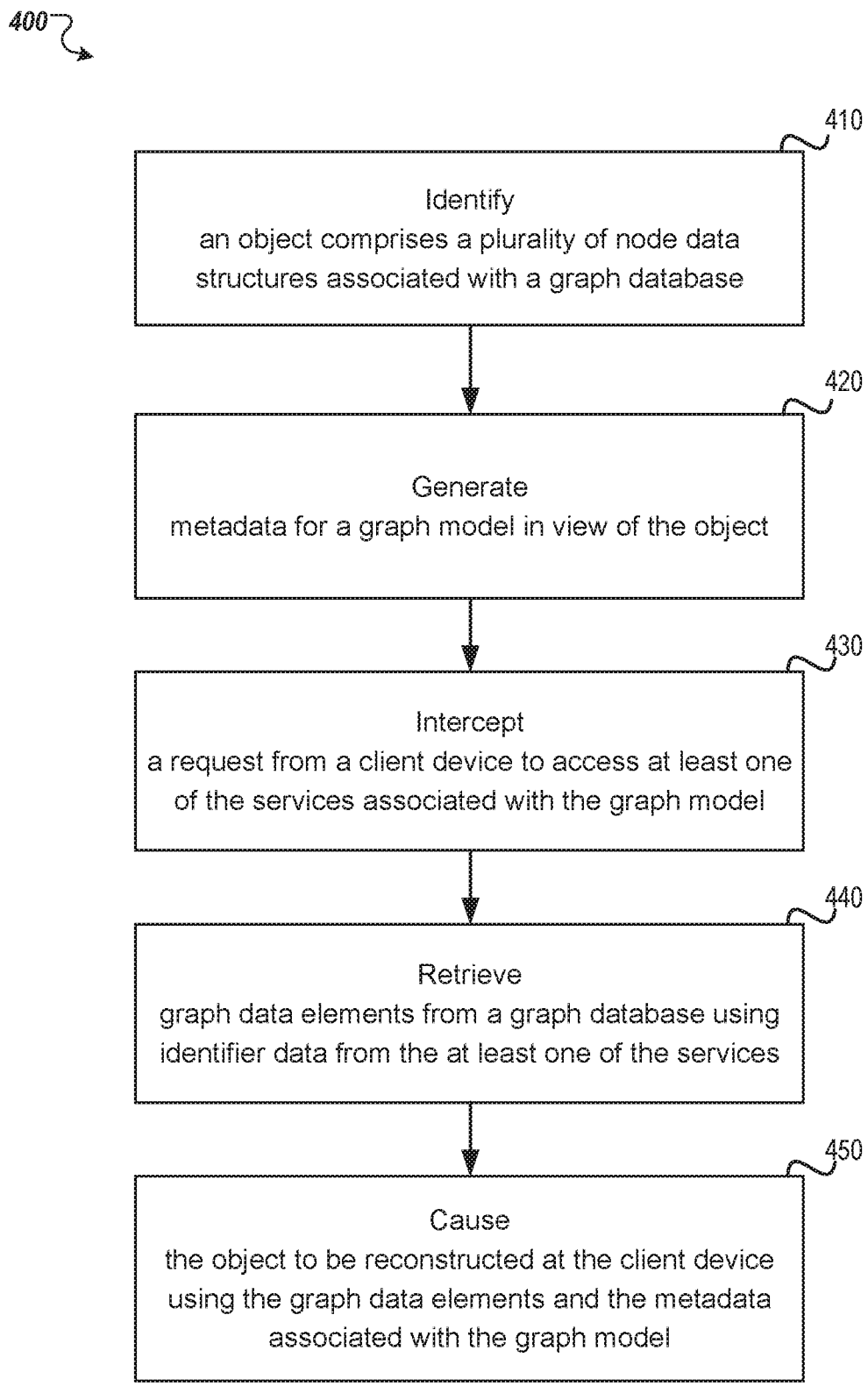
FIG. 4 illustrates a flow diagram of a method of supporting graph database backed object unmarshalling according to an implementation of the disclosure.

FIG. 4 depicts a flow diagram of one implementation of a method 400 in accordance with one or more aspects of the disclosure. In one implementation, the processing device 220 of FIG. 2 may perform method 400 for supporting graph database backed object unmarshalling. The method 400 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 400 and each of its individual functions. In certain implementations, a single processing thread may perform method 400. Alternatively, two or more processing threads with each thread executing one or more individual functions, routines, subroutines, or operations may perform method 400. It should be noted that blocks of method 400 depicted in FIG. 4 can be performed simultaneously or in a different order than that depicted.

Referring to FIG. 4, at block 410, method 400 identifies an object 169 comprises a plurality of node data structures 162 associated with a graph database 160. In block 420, metadata 185 for a graph model 184 is generated in view of the object 169. This graph model 184 defines one or more services 182 provided by the object 169. A request 115 from a client device 109 to access at least one of the services 182 associated with the graph model 184 is intercepted in block 430. In block 440, graph data elements 168 are retrieved from a graph database 160 using identifier data 183 from the at least one of the services 182. The identifier data 187 identifies at least one node data structure 162 associated with the object 169. In block 450, method 400 causes the object 169 to be reconstructed at the client device 109 using the graph data elements 168 and the metadata 185 associated with the graph model 184.

Figure 5:
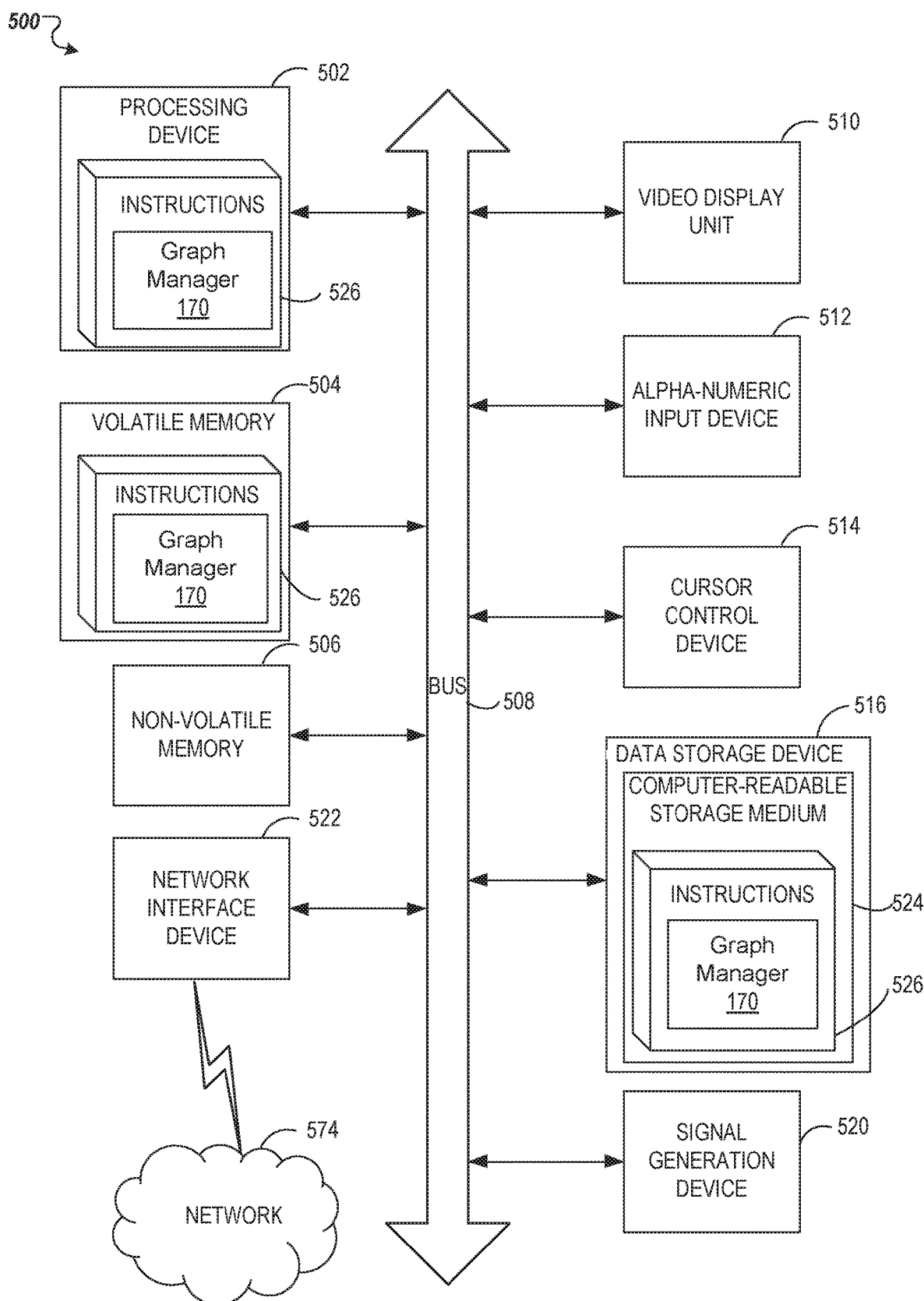
FIG. 5 illustrates a block diagram illustrating a machine in which implementations of the disclosure may be used.

FIG. 5 depicts a block diagram of a machine in the form of a computer system 500 within which a set of instructions, for causing the machine to perform any one or more of the methodologies discussed herein, may be executed. In various illustrative examples, computer system 500 may correspond to a processing device 120, 220 within system 100 or system 300 of FIG. 1 and FIG. 2 respectively. The machine 500 may be included within a data center that supports virtualization. Virtualization within a data center results in a physical system being virtualized using virtual machines to consolidate the data center infrastructure and increase operational efficiencies.

A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for live storage domain decommissioning.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding the graph manager 170 of FIG. 1 for implementing method 300 of FIG. 3 or method 400 of FIG. 4 for supporting graph database backed object unmarshalling.

Instructions 526 may also reside, completely or partially, within volatile memory 504 and/or within processing device 502 during execution thereof by computer system 500, hence, volatile memory 504 and processing device 502 may also constitute machine-readable storage media.

While non-transitory computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "identifying," "determining," "intercepting," "updating," "retrieving," "generating," "inspecting," "causing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems appears as set forth in the description below. In addition, the disclosure is not described with reference to any particular programming language. It is appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A server device comprising:
a memory to store data of a graph database; and
a processing device, operatively coupled to the memory, to:
receive, from a client device, a graph query for graph data elements;

inspect a graph model associated with an object comprising a plurality of node data structures corresponding to the graph data elements, the graph model to define one or more first services provided by each node of the object, wherein the one or more first services represent one or more methods available to the object;

identify the graph data elements from the graph database for at least one node data structure of the object in view of the inspected graph model;

generate metadata that describes the object associated with the inspected graph model, wherein the metadata comprises an object-type discriminator for the object and instructs an application of the client device with regard to unmarshalling the object using the graph data elements; and provide, to the client device in response to the received graph query, the metadata to reconstruct, using the graph data elements, one or more second services associated with the object at the client device, wherein the object-type discriminator describes what model to use to reconstruct the one or more second services, and wherein the one or more second services mimic the one or more first services.

2. The server device of claim 1, wherein the metadata further comprises information to describe the graph model to instantiate a representation of the object consumable by the client device.

3. The server device of claim 2, wherein the processing device is further to manage a distribution of the metadata to cause the representation of the object to reconstruct at the client device.

4. The server device of claim 1, wherein the processing device is further to:
identify an access by the client device to at least one service of the one or more services; and
retrieve the graph data elements from the graph database for the at least one node data structure in view of identifier data from the at least one service.

5. The server device of claim 4, wherein the identifier data comprises an identifier to identify the at least one node data structure in the graph database.

6. The server device of claim 4, wherein the identifier data comprises an identifier to identify data in the graph database that is linked to the at least one node data structure.

7. The server device of claim 4, wherein the identifier data comprises an identifier to identify a starting node data structure in the object associated with the at least one node data structure and a matching criteria to identify the node data structures related to the starting node data structure.

8. A method comprising:
identifying, by a processing device of a server device, an object comprises a plurality of node data structures associated with a graph database;
generating, by the processing device, metadata for a graph model in view of the object, wherein the graph model defines one or more first services provided by the object, wherein the one or more first services represent one or more methods available to the object and wherein the metadata comprises an object-type discriminator for the object and instructs an application of a client device with regard to unmarshalling the object using graph data elements;
intercepting, by the processing device, a request from a client device to access at least one of the first services associated with the graph model;
retrieving, by the processing device, the graph data elements from a graph database using identifier data from the at least one of the first services, wherein the identifier data to identify at least one node data structure associated with the object; and
causing, by the processing device, one or more second services to reconstruct at the client device using the graph data elements and the metadata associated with the graph model, wherein the object-type discriminator describes what model to use to reconstruct the one or more second services, and wherein the one or more second services mimic the one or more first services.

9. The method of claim 8, wherein the metadata further comprises information to describe the graph model to instantiate a representation of the object consumable by the client device.

10. The method of claim 9, further comprising:
inspecting the graph model to identify the object; and
managing a distribution of the metadata to cause the representation of the object to reconstruct at the client device.

11. The method of claim 8, wherein the identifier data comprises an identifier to identify the at least one node data structure in the graph database.

12. The method of claim 8, wherein the identifier data comprises an identifier to identify data in the graph database that is linked to the at least one node data structure.

13. The method of claim 8, wherein the identifier data comprises an identifier to identify a starting node data structure in the object associated with the at least one node data structure and a matching criteria to identify the node data structures related to the starting node data structure.

14. A non-transitory computer-readable medium comprising instructions that, when executed by a processing device, cause the processing device to:
receive, by the processing device, a graph query for graph data elements;
inspect, by the processing device, a graph model associated with an object comprising a plurality of node data structures corresponding to the graph data elements, the graph model to define one or more first services provided by each node of the object, wherein the one or more first services represent one or more methods available to the object;
identify, using a graph database, the graph data elements for at least one node data structure of the object in view of the inspected graph model;
generate metadata that describes the object associated with the inspected graph model, wherein the metadata comprises an object-type discriminator for the object and instructs an application of a client device with regard to unmarshalling the object using the graph data elements; and
provide, to the client device in response to the received graph query, the metadata to reconstruct, using the graph data elements, one or more second services associated with the object at the client device, wherein the object-type discriminator describes what model to use to reconstruct the one or more second services, and wherein the one or more second services mimic the one or more first services.

15. The non-transitory computer-readable medium of claim 14, wherein the metadata further comprises information to describe the graph model to instantiate a representation of the object consumable by the client device.

16. The non-transitory computer-readable medium of claim 15, wherein the processing device is further to manage a distribution of the metadata to cause the representation of the object to reconstruct at the client device.

17. The non-transitory computer-readable medium of claim 14, wherein the processing device is further to:
   identify an access by the client device to at least one service of the one or more services; and
   retrieve the graph data elements from the graph database for the at least one node data structure in view of identifier data from the at least one service.

18. The non-transitory computer-readable medium of claim 17, wherein the identifier data comprises an identifier to identify the at least one node data structure in the graph database.

19. The non-transitory computer-readable medium of claim 17, wherein the identifier data comprises an identifier to identify data in the graph database that is linked to the at least one node data structure.

20. The non-transitory computer-readable medium of claim 17, wherein the identifier data comprises an identifier to identify a starting node data structure in the object associated with the at least one node data structure and a matching criteria to identify the node data structures related to the starting node data structure.

\* \* \* \* \*